(12) United States Patent
Jaworski et al.

(10) Patent No.: US 8,248,543 B2
(45) Date of Patent: Aug. 21, 2012

(54) SWIVEL OVERHEAD VIDEO DISPLAY SCREEN WITH DRIVER DISTRACTION INTERLOCK

(75) Inventors: David J. Jaworski, Birmingham, MI (US); Sennan S. Alkarawi, Bloomfield Hills, MI (US); Stephen Muench-Casanova, Rochester, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 867 days.

(21) Appl. No.: 12/199,839

(22) Filed: Aug. 28, 2008

(65) Prior Publication Data
US 2010/0053480 A1    Mar. 4, 2010

(51) Int. Cl.
*H04N 5/64* (2006.01)
(52) U.S. Cl. ......................................... 348/837; 348/839
(58) Field of Classification Search ................... 348/836, 348/837, 838, 839, 840, 841, 842, 843; 296/37.7
See application file for complete search history.

(56) References Cited

U.S. PATENT DOCUMENTS

| | | | |
|---|---|---|---|
| 4,824,159 A * | 4/1989 | Fluharty et al. | 362/492 |
| 6,364,390 B1 * | 4/2002 | Finneman | 296/37.7 |
| 6,409,242 B1 * | 6/2002 | Chang | 296/37.7 |
| 6,789,843 B2 | 9/2004 | De Gaillard | |
| 6,992,883 B2 * | 1/2006 | Oh | 361/679.05 |
| 7,055,790 B2 * | 6/2006 | Schroeter | 248/323 |
| 2007/0022448 A1 | 1/2007 | Muench-Casanova et al. | |
| 2007/0132894 A1 * | 6/2007 | Vitito | 348/837 |
| 2009/0251624 A1 * | 10/2009 | Ikunami | 348/837 |
| 2011/0090411 A1 * | 4/2011 | Finneman | 348/837 |

* cited by examiner

*Primary Examiner* — Jeanette E Chapman
*Assistant Examiner* — James Buckle, Jr.
(74) *Attorney, Agent, or Firm* — Ralph E. Smith

(57) ABSTRACT

A vehicle having an overhead video display screen system includes a rear video screen that is swivelable between a rearward facing and a forward facing configuration. The vehicle further includes a second row of seats that can be swiveled to view the rear video screen when it is facing forward. The vehicle may further include a forward video screen configured to block a driver's rearview of the rear screen when in the forward facing configuration. A driver distraction interlock system is provided in communication with the rear screen and the forward screen to prevent video from being displayed on the rear screen if the rear screen is viewable by the driver in his or her rearview mirror. In a preferred method, video can be displayed on a front facing rear screen when the forward screen is deployed thereby obstructing the driver from being able to see the rear screen.

22 Claims, 12 Drawing Sheets

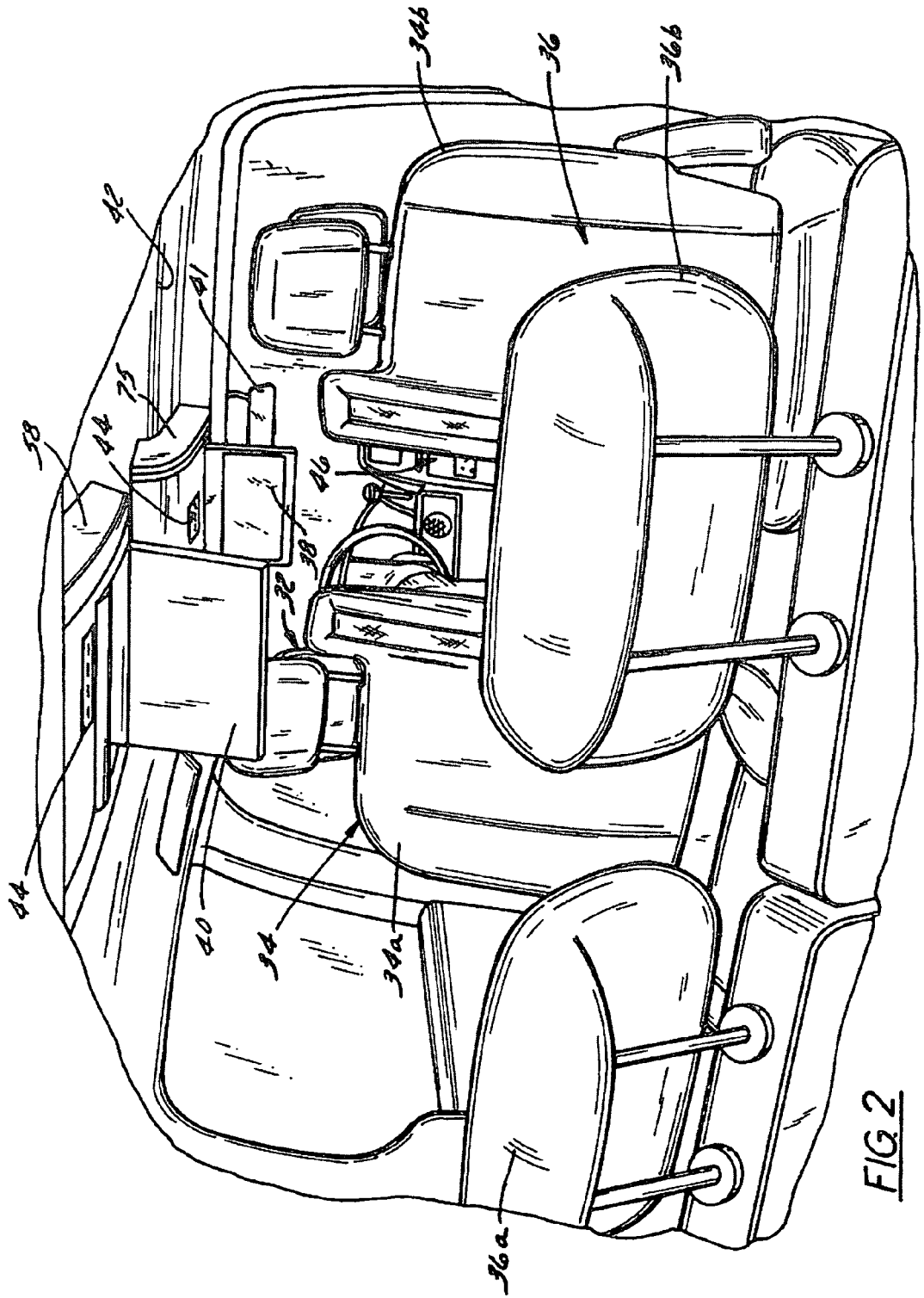

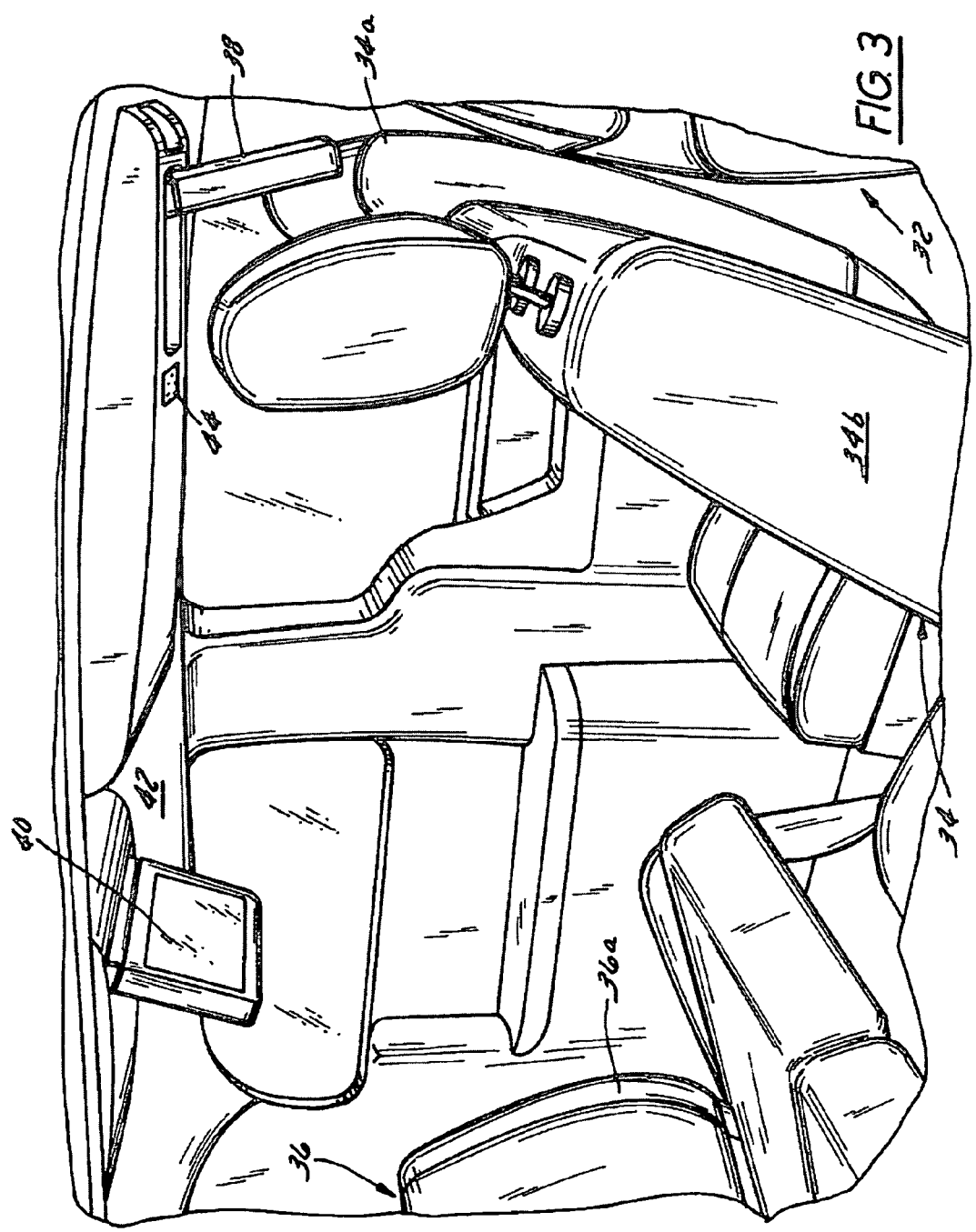

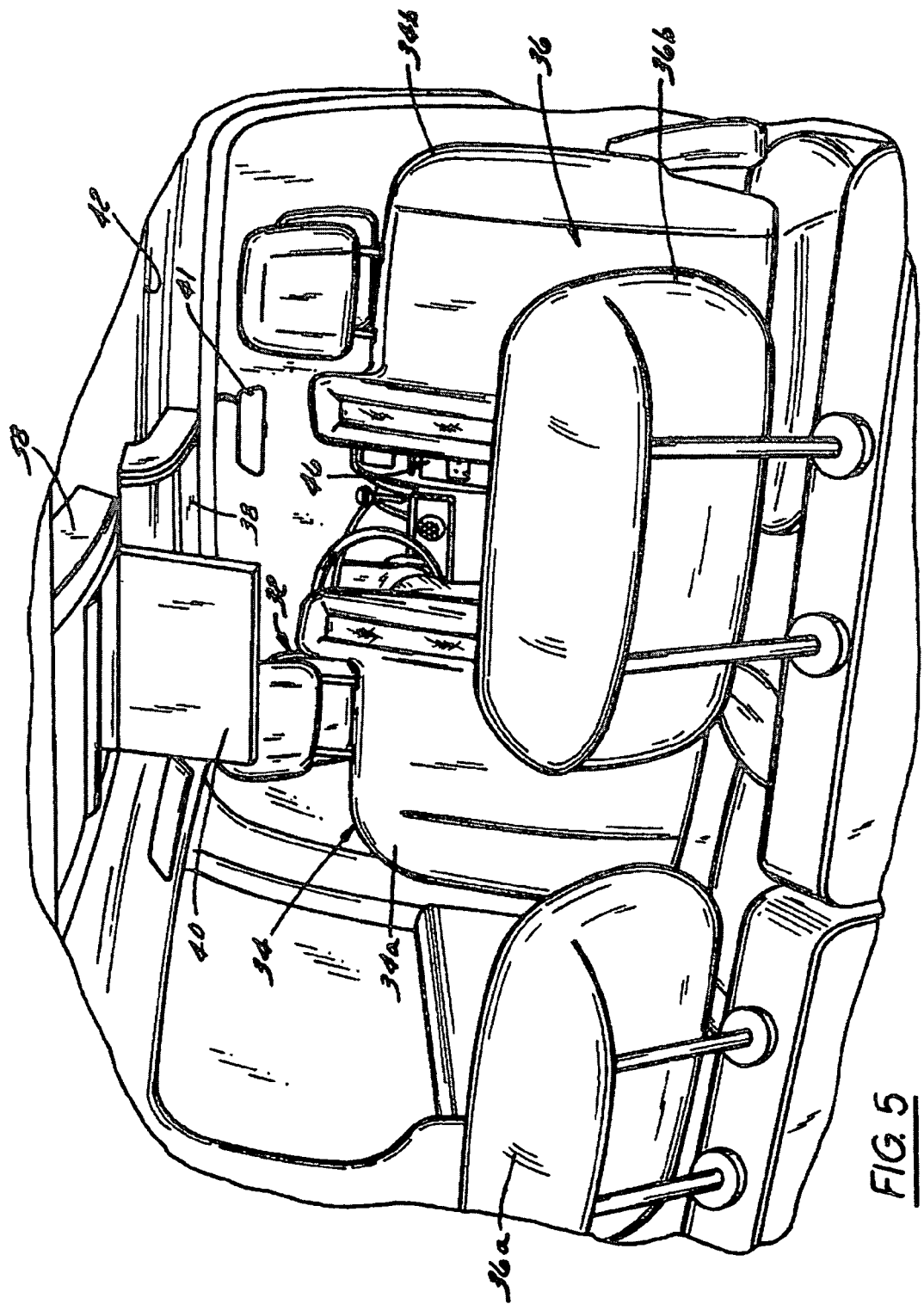

SWIVEL OVERHEAD VIDEO DISPLAY SCREEN WITH DRIVER DISTRACTION INTERLOCK

FIELD

The present invention relates to motor vehicles having video display screens mounted in the interior, and more particularly to motor vehicles having a video display screen system in communication with a driver distraction interlock system.

BACKGROUND

Overhead video display screen systems for use in motor vehicles are well known in the art. Typically, these systems include a single overhead video screen viewable by passengers seated in a second and/or third row of seats. The overhead video screen is in communication with a set of controls configured to selectively display video on the screen. In some instances, a motor vehicle may include a dual video screen system adapted for viewing by different rows of passengers. For example, some minivans include a first video screen adapted to be viewed by the passengers seated in a second row of seats and a second video screen adapted to be viewed by the passengers seated in a third row of seats.

In some vans and minivans, the second row of seats may be swiveled by the passenger such that the passenger may rotate his or her seat at least 180° and as much 360° in some instances. As such, a passengers seated in the second row of seats may swivel his or her seat such that he or she is facing the rear of the motor vehicle. In this configuration, the passengers seated in the second row of seats are unable to view the rearward facing video screen.

As such, a video display screen system including a swivelable video screen that may be configured to face forward to be viewed by passengers seated in a second row of seats facing the rear of the vehicle is desired. However, state laws prohibit having video display screens that are viewable by the driver of a vehicle in motion as such screens are potentially distracting to the driver who may be able to see the video in his or her rearview mirror. Accordingly, a system configured to comply with these state laws while still allowing video screen that can swivel between a front facing and rear facing position is desired.

SUMMARY

The present invention is directed to improvements of known motor vehicle video display systems. A motor vehicle video display system of the present invention is adapted to prevent the display of video under a predetermined set of circumstances. For example, in a dual-screen configuration, the video display system is configured to prevent the displaying of video when a forward video screen is closed and a rear video screen is swiveled to a forward-facing position. This is done to prevent a driver of the vehicle from being able to view displayed video on the rear video screen when the vehicle is in motion without the forward video screen being in an open position.

Alternatively, in a single-screen configuration, the video display system is configured to prevent the display of video on the screen when the screen is facing forward and the vehicle is not in park.

In a preferred embodiment where the vehicle is equipped with dual video screen system, an interlock is provided that includes a controller and sensors used monitor the forward video screen and rear video screen when the vehicle is in motion to enable video to be displayed on the rear video screen when it faces forwardly only when the forward video screen is deployed in an open position. Where there is a single screen, the controller is configured to monitor which direction the rear video screen is facing and only permit the rear video screen to display video when facing forwardly only when the vehicle is not in motion. Where the rear video screen is facing forwardly under conditions where it is prohibited from displaying video, an informative status message is displayed on the rear video screen indicating that video cannot be displayed.

Accordingly, an object of the present invention is to provide a video display system that is selectively configurable while ensuring that the driver of the vehicle is not distracted thereby.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 2 is a rear perspective view of the interior of the motor vehicle of FIG. 1 showing the rear video screen is swiveled to face the front of the vehicle;

FIG. 3 is a perspective view from a front passenger side of the interior of the motor vehicle of FIGS. 1 and 2;

FIG. 5 is a rear perspective view of the motor vehicle showing the rear video screen swiveled to face the front of the vehicle and a second row of seats swiveled to face a rear of the vehicle;

Figure 1:
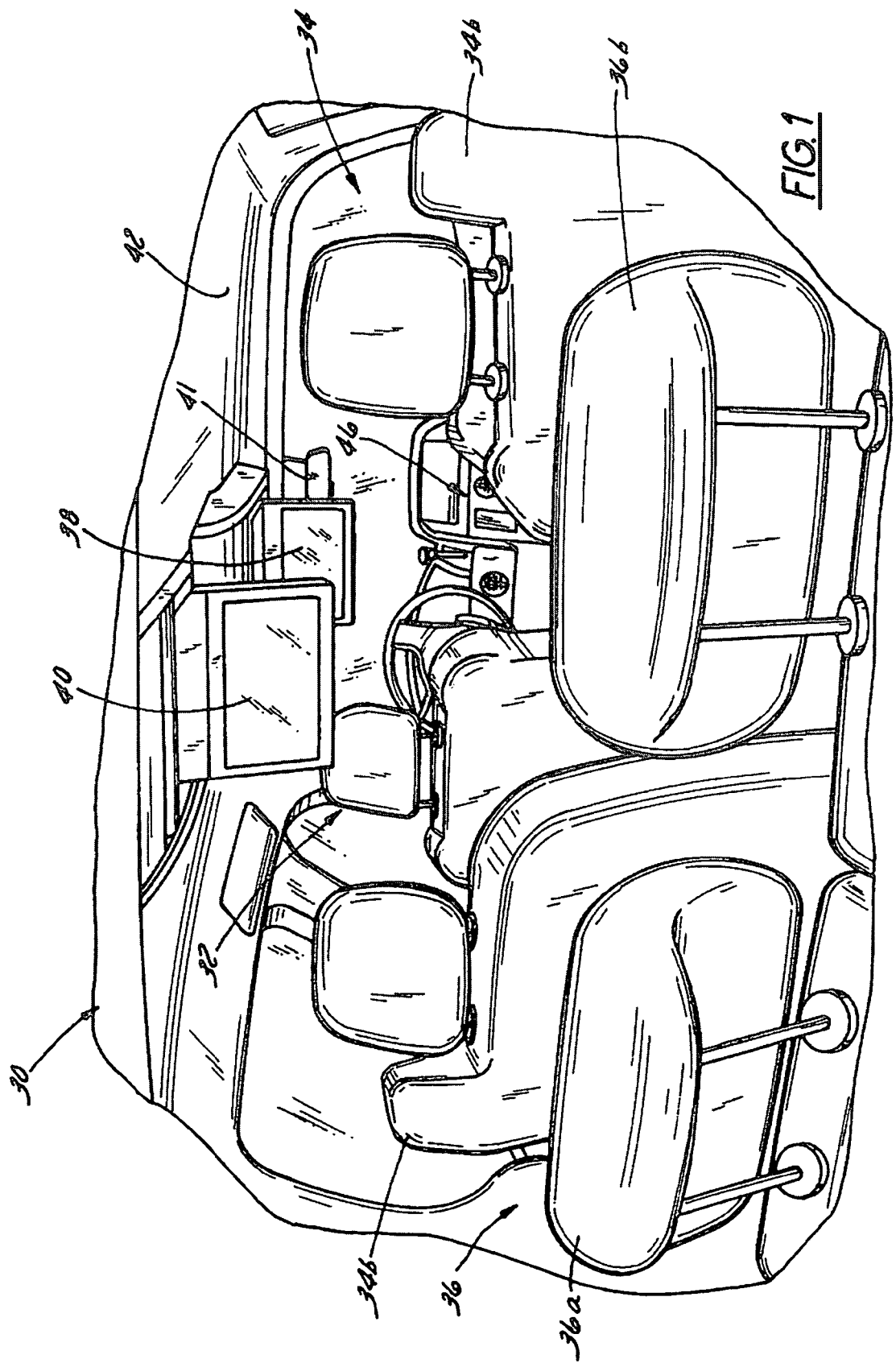
FIG. 1 is a rear perspective view of a motor vehicle interior including an overhead video display screen system in accordance with the present invention.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Referring now to the drawings, and initially FIGS. 1-2, a motor vehicle 30, such as a minivan, includes three rows of seating having a front row 32 for the driver and a single passenger, a second row 34 having a pair of seats 34a, 34b, and a third row 36 having a pair of seats 36a, 36b. The seats 34a, 34b of the second row of seats are configured to be swiveled by a user thereof such that the seats 34a, 34b may be positioned to face the front of the vehicle 30 or the rear of the vehicle 30. A forward video screen 38 and rear video screen 40 are mounted to a ceiling 42 of the vehicle 30 with the forward video screen 38 being located so as to be viewable by passengers sitting in the second row of seats 34a and 34b. The rear video screen 40 can be swiveled 180 degrees such that it can be viewed by passengers sitting in the third row of seats 36a and 36b when facing toward the rear of the vehicle 20 and, under certain conditions as discussed in more detail below, can be viewed by passengers sitting in the second row of seats 36a and 36b when facing toward the front of the vehicle 20.

These video screens 38 and 40 typically include a display, such as an LCD display or the like, which forms the portion of the video screen upon which video is shown. Forward video screen 38 is adapted to be selectively positionable between an open and a closed position. Rear video screen 40 is likewise adapted to be selectively positionable between an open and a closed position. In addition, rear video screen 40 is configured such that it can be swiveled 180 degrees about a vertical axis when in the open position. Accordingly, rear video screen 40 may be configured to be viewed by the passengers in the third row 36 when the rear video screen 40 is facing the rear of vehicle 30 or the passengers in the second row 34 when the rear video screen 40 is facing the front of the vehicle and the seats 34a, 34b of the second row 34 are facing the rear of the vehicle.

Referring now to FIG. 1 in particular, the forward video screen 38 and the rear video screen 40 are shown in the open position wherein the screens 38, 40 are selectively viewable by passengers in the vehicle 30. Further, rear screen 40 is shown in its rearward facing position such that it is viewable by passengers in the third row 36 of seats.

Referring to FIGS. 2-3, the seats 34a, 34b of the second row 34 are shown rotated to face the rear of the vehicle 30. The forward video screen 38 and rear video screen 40 are both in the open position. Rear video screen 40, however, is shown in its forward facing position such that the rear video screen 40 is viewable by the passengers seated in the seats 34a, 34b of the second row of seats 34. In a preferred embodiment, the forward video screen 38 and rear video screen 40 may be controlled by a remote control (not shown) and a set of front video display controls 46 located in the driver's dashboard console. The remote and front video display controls 46 are configured to selectively control the display of video on the forward video screen 38 and rear video screen 40. In an alternative embodiment, a set of overhead video display controls 44 can be positioned within the vehicle 30 to allow the passengers of the vehicle to selectively control the display of video on the video screens 38, 40. In this embodiment, the vehicle 30 may additionally include a set of front video display controls 46 configured to allow the driver or other front seat passenger to selectively control the display of video on video screens 38, 40. For example, when the passengers seated in the second row 34 and third row 36 are relatively young passengers incapable of manipulating the controls, the driver or other passenger may then control the display of video from the front of the vehicle.

Figure 4A:
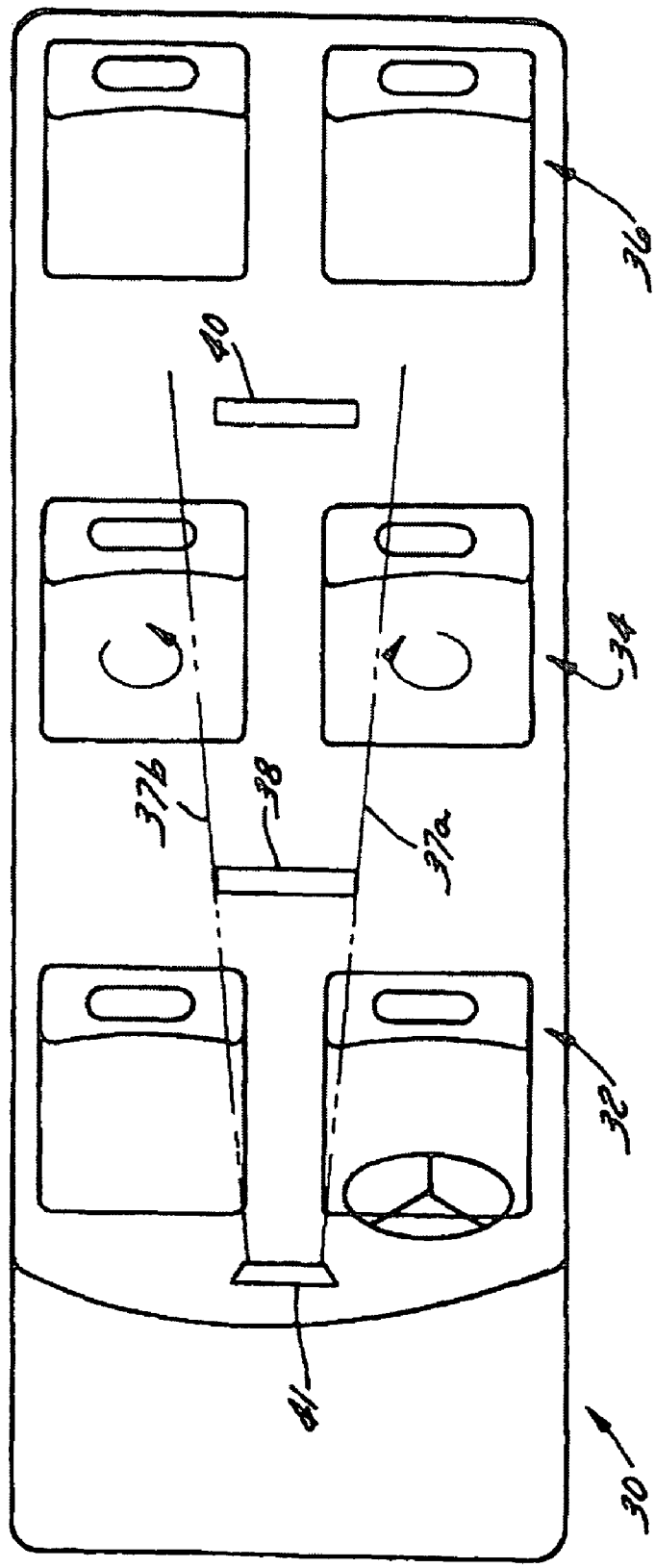
FIG. 4A is a schematic top plan view of the interior of the motor vehicle including the overhead video display screen system of the present invention showing how the forward video screen obscures the rear video screen when both are deployed in an open position.
Figure 4B:
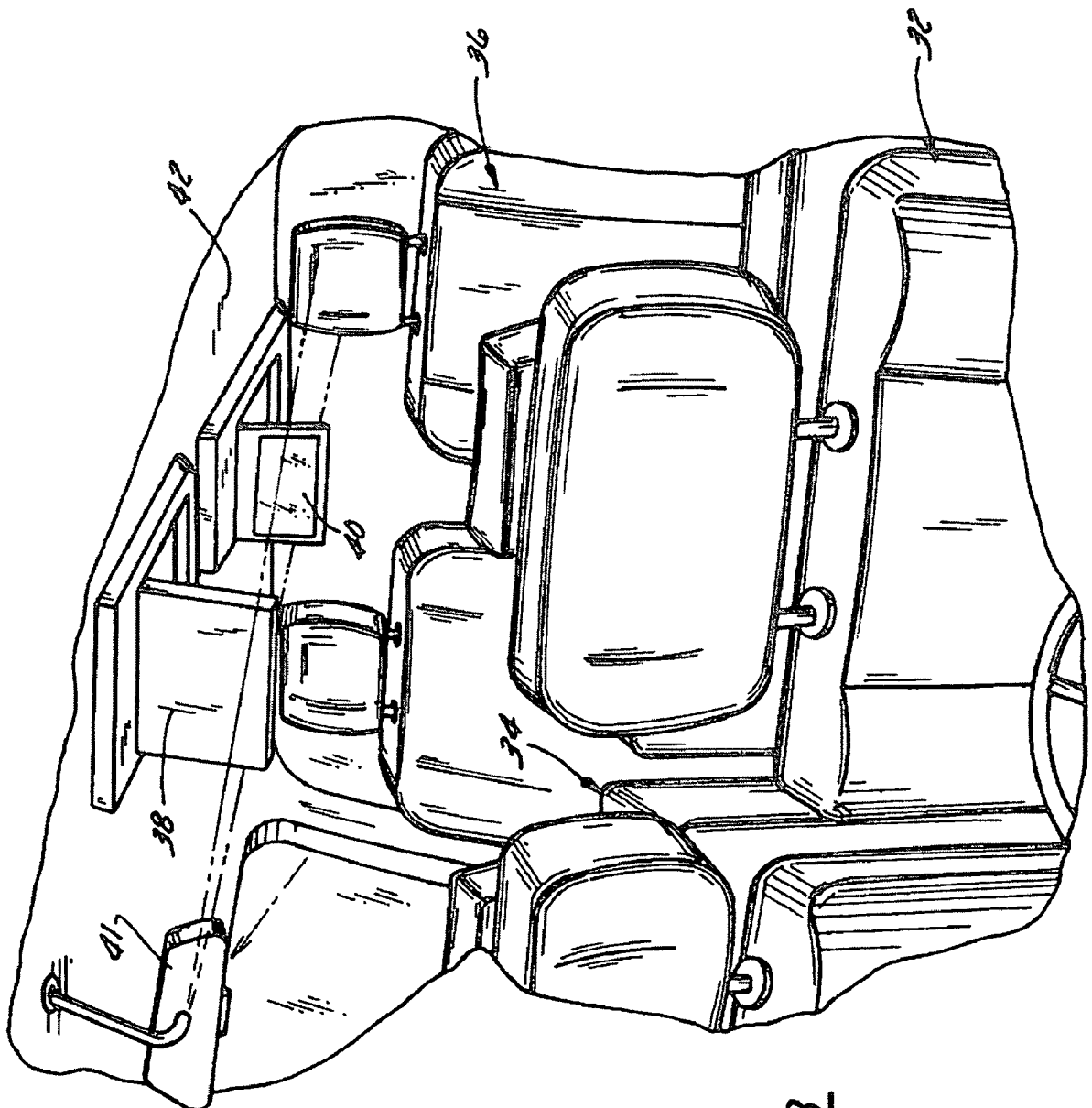
FIG. 4B is a front perspective view looking rearward from the front of the vehicle depicting how the forward video screen lies in front of the rear video screen in the line of sight of a driver looking through the rear view mirror of the vehicle

Now turning to FIGS. 4A and 4B, the vehicle 30 of the present invention is shown with both the forward video screen 38 and the rear video screen 40 in the open position. As shown by driver line-of-sight lines 37a, 37b, the forward video screen 38 is positioned such that the driver is incapable of seeing the rear video screen 40 when looking into the rearview mirror 41 of the vehicle 30. More specifically, because of the aspect ratio of the forward video screen 38 being positioned in line with and front of the rear video screen 40 that results from being closer to the driver, the forward video screen 38 obscures the rear video screen 40 when the driver is looking through the rearview mirror 41 thereby permitting rear video screen 40 to face forwardly when the forward video screen 38 is open. Accordingly, when the forward video screen 38 is open, the rear video screen 40 will be allowed to display video regardless of whether the rear video screen 40 is facing the front of the vehicle or the rear of the vehicle, as the forward video screen 38 blocks the view of the driver.

Turning to FIG. 5, the forward video screen 38 is shown in its closed position such that it is stowed and secured into a recess disposed in the ceiling 42 of the vehicle 30. The rear video screen 40 is shown in its open and forward facing positions such that the passengers in the rearward facing second row of seats 34 are able to view the rear video screen 40. However, as discussed in more detail below, a driver interlock method in accordance with the present invention prevents the forward facing rear video screen 40 from displaying video until the forward video screen 38 is deployed by being pulled down into the open position so as to obstruct the driver from being able to view of the rear video screen 40.

Figure 6:
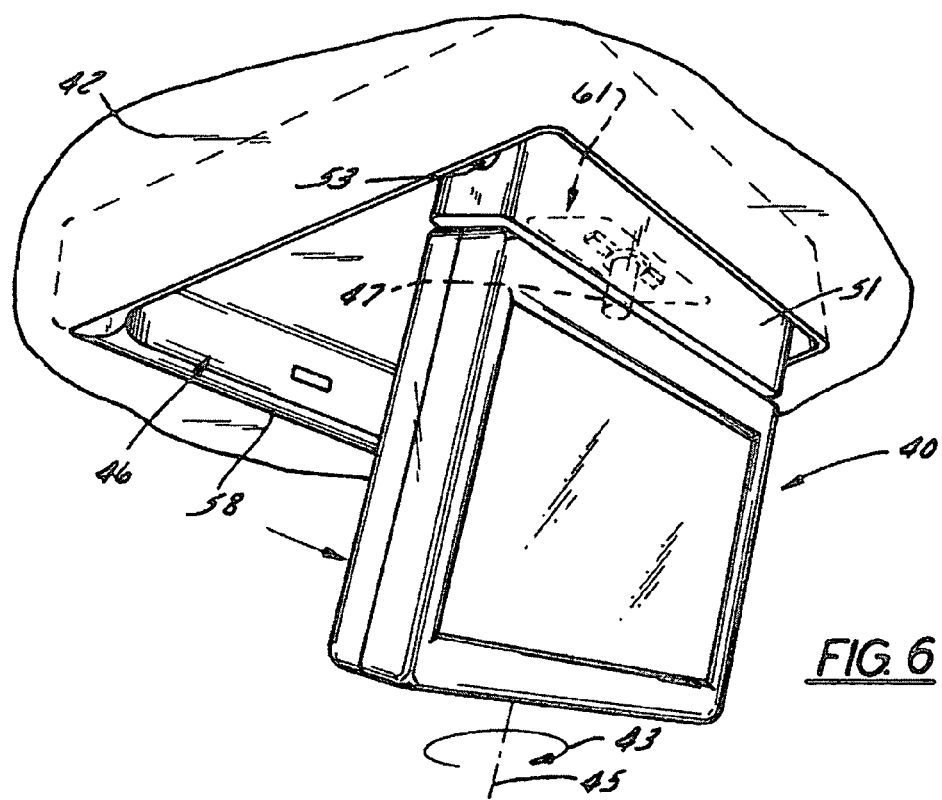
FIG. 6 is a perspective view of the rear video screen rotated to face the front of the vehicle.
Figure 7:
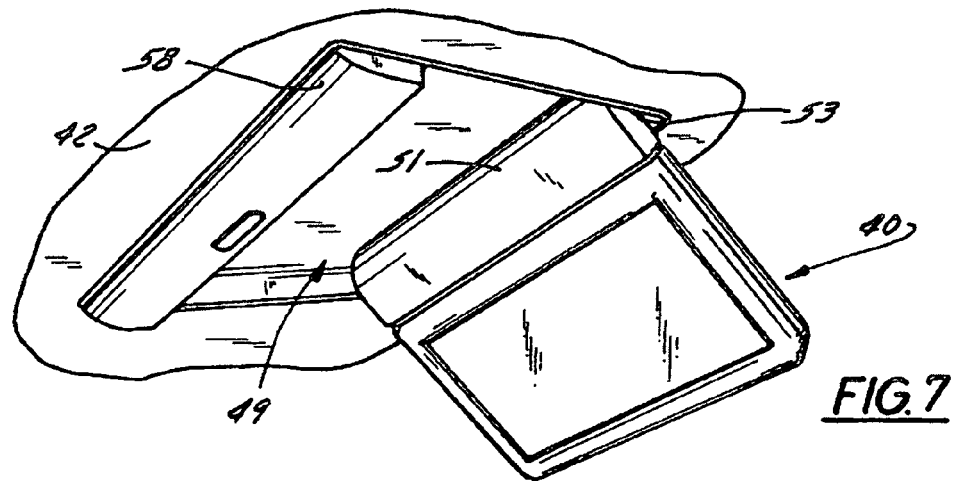
FIG. 7 is a perspective view of the rear video screen rotated to face the rear of the vehicle.

Now referring to FIGS. 6-7, swivel operation of the rear video screen 40 is shown. In FIG. 6, the rear video screen 40 is shown in its forward facing position such that passengers in the second row 34 are able to view the rear video screen 40 if the seats 34a, 34b are swiveled to face the rear of the vehicle. As indicated by arrow 43, rear video screen 40 is mounted on a pivot 47 that extends outwardly from a hinged base 51 that enables the screen 40 to rotate 180 degrees about a central screen axis 45 between the forward facing position and rearward facing position. In FIG. 7, the rear video screen 40 is shown rotated 180 degrees to its rearward facing position such that passengers in the third row 36 of seats are able to view video displayed thereon. Further, when desired, rear video screen 40 may be stored in its closed position within compartment 49 which is configured to securely stow the rear video screen. In operation, the rear video screen 40 is simply slid along a groove or slot within the compartment 49 on a pair of opposed rollers, pins, or similar such projections 53 and then rotated about a horizontal axis defined by the projections 53 for storing within the compartment 49. In a preferred embodiment, structure 53 functions as a hinge about which the rear video screen 40 pivots when being deployed. A latching mechanism or the like may be included for securing the rear video screen 40 within compartment 49.

Figure 8:
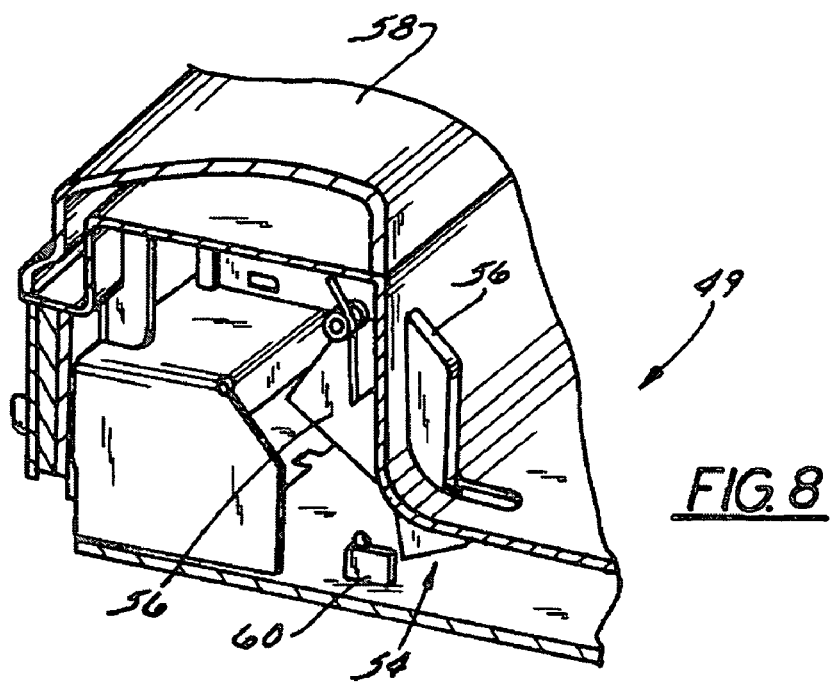
FIG. 8 is a partial cross section of an open/close switch for the rear video screen in an open position.
Figure 9:
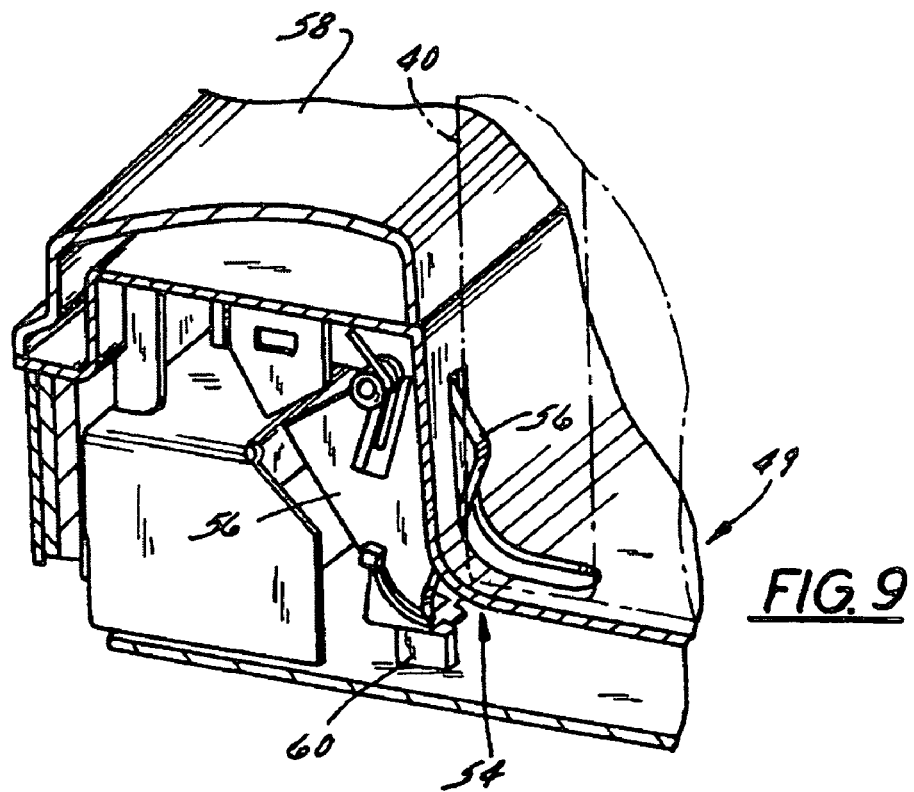
FIG. 9 is a partial cross section of the open/close switch of FIG. 9 in a closed position.
Figure 16:
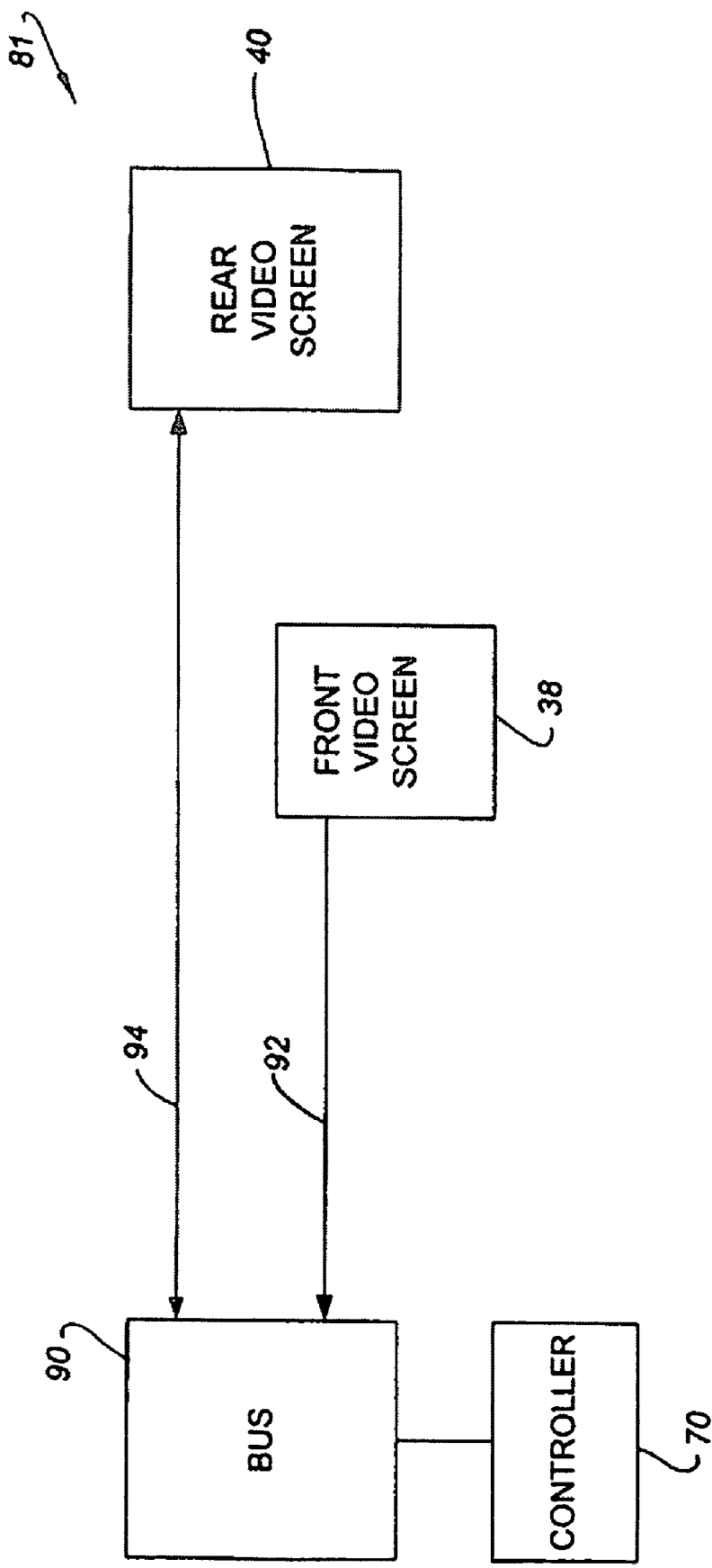
FIG. 16 is a schematic diagram of the driver distraction interlock system controller and bus topology.

Turning now to FIGS. 8-9, and initially to FIG. 8, the rear video screen 40 employs an open/close switch mechanism 54 initially shown in its off position, i.e., the rear video screen 40 is in its open position. Switch mechanism 54 includes a rotatable detent arm 56 which is biased such that it projects out from part of a console 58 when the rear video screen 40 is deployed in its open position causing a rear video screen deployment indicator switch 60 of the switch mechanism 54 to be disposed in the off or open position. When the rear video screen 40 is rotated upwardly into the closed position, the detent arm 56 is urged by the video screen 40 into the console 58 such that it depresses and closes the switch 60 turning the switch on as shown in FIG. 9. In other words, when the rear video screen 40 is open or deployed, switch 60 is open or off, and when the rear video screen 40 is closed, the switch is closed or on. As is shown in FIG. 16 and discussed in more detail below, the rear video screen deployment indicator switch 60 is linked to a controller 70 to indicate whether the rear video screen 40 is in its open or closed position.

Figure 10:
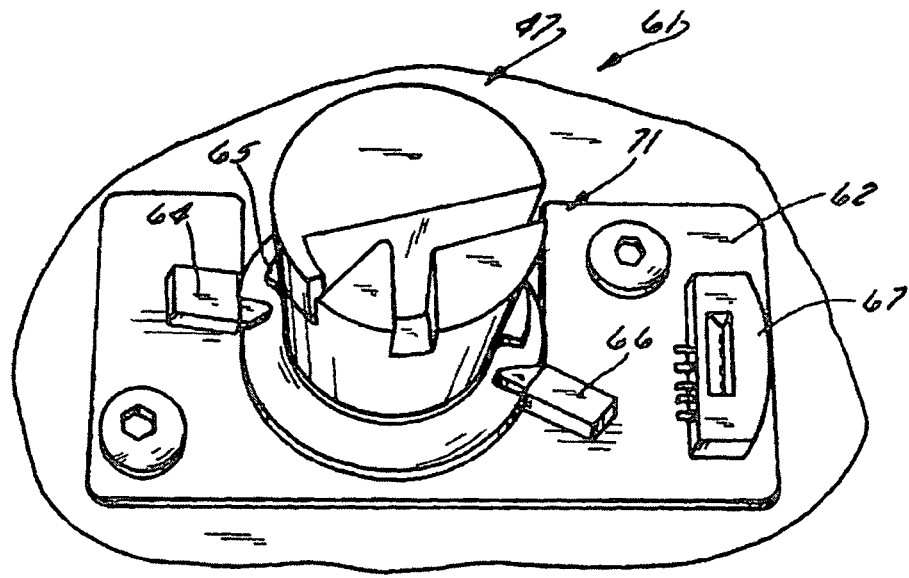
FIG. 10 is a top perspective view of a swivel screen switch of the rear video screen of the present invention.
Figure 11:
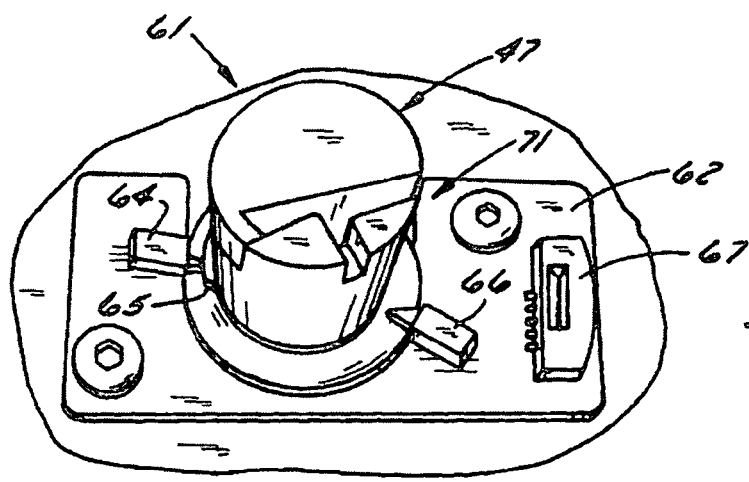
FIG. 11 is a top perspective view of the swivel screen switch of FIG. 10 rotated approximately ten degrees counterclockwise.
Figure 12:
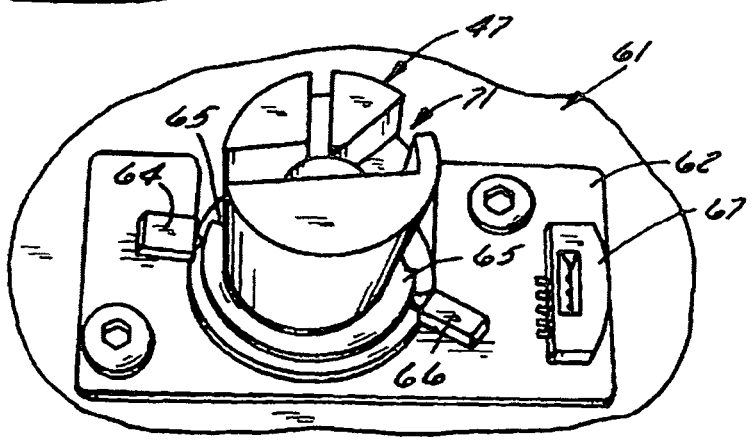
FIG. 12 is a top perspective view of the swivel screen switch of FIGS. 10-11 rotated 180 degrees.

Now referring to FIGS. 10-12, the rear video screen 40 further includes a swivel switch arrangement 61 configured to relay the position of the rear video screen 40, i.e., forward or rearward facing, to the controller 70 (FIG. 16) when the rear video screen 40 has been deployed in an open position. The swivel switch arrangement 61 includes the pivot 47 disposed in operable communication with first and second video screen rotational position switches 64 and 66 mounted on a circuit board 62 that can include an integrated circuit 67, such as an integrated circuit used to facilitate communication with the controller 70 (FIG. 16). Electrical component 67 can also be a circuit board cable connector that connects a cable (not shown) used to communicate switch signals from switches 64 and 66 to controller 70.

The pivot 47 has a notch arrangement 71 that engages part of the rear video screen 40, such as part of its housing, in a manner that holds the screen 40 while it is deployed in an open position in a manner that permits it to be rotated. Other means can be employed to fasten or otherwise mount the rear video screen 40 to the pivot 47. The pivot 47 is rotatively supported by a bearing arrangement (not shown) disposed in the console that can be anchored to a portion of the chassis of the vehicle. The pivot 47 includes a radially outwardly extending flange 65 that functions as a switch triggering cam 65 that successively triggers switches 64 and 66 as the rear video screen 40 is rotated between a rearward facing position and forward facing position.

Pivot 47 is configured to rotate about a vertical axis causing a leading edge of cam 65 to contact switches 64 and 66 to indicate the swivel position of the rear video screen 40. Referring to FIG. 10, the pivot 47 is shown at 0 degrees such that the rear video screen 40 is facing the rear of the vehicle 30. When the rear video screen 40 is disposed in the rearward facing position facing the rear of the vehicle 30, neither switch 64, 66 is depressed or closed as is shown in FIG. 10.

As the rear video screen 40 is rotated counterclockwise, the pivot 47 rotates in unison with the screen 40. As the pivot 47 is rotated counterclockwise, a leading edge of the flange 65 contacts the first switch 64 depressing it and turning it on as seen in FIG. 11. Preferably, the switch engaging flange 65 and first switch 64 are positioned relative to one another such that the leading edge of the flange 65 first contacts the first switch 64 at approximately 10 degrees (±5°) relative to the initial rearward facing position.

Turning to FIG. 12, as the rear video screen 40 is rotated to its forward facing position, the flange 65 rotates in unison with the pivot 47 and contacts the second switch 66 thereby turning the second switch 66 on. As is shown in FIG. 12, the first switch 64 also remains depressed and turned on. As a result, when the rear video screen 40 and pivot 47 have been turned to the forward facing position, the flange 65 depresses both switches 64 and 66 indicating that the rear video screen 20 is facing the front of the vehicle. As is discussed in more detail below, whether the rear video screen 40 is disposed in the rearward facing position such that neither one of the switches 64 and 66 are depressed, disposed in the forward facing position such that both switches 64 and 66 are depressed, or disposed in an in between position such that only one of the switches, namely only switch 64, is depressed is communicated to controller 70.

In operation, when the rear video screen 40 is positioned such that neither the first switch 64 or the second switch 66 are on, the display of video of on the rear video screen is permitted. When the rear video screen 40 is rotated such that only the first switch 64 is turned on the display of video on the rear video screen is prohibited. Once the rear video screen is rotated such that switches 64 and 66 are on, the display of video thereon is permitted. Accordingly, the display of video on the rear video screen 40 is only permitted when the rear video screen is in its forward or rearward facing configuration and not at any point of rotation therebetween.

Figure 13:
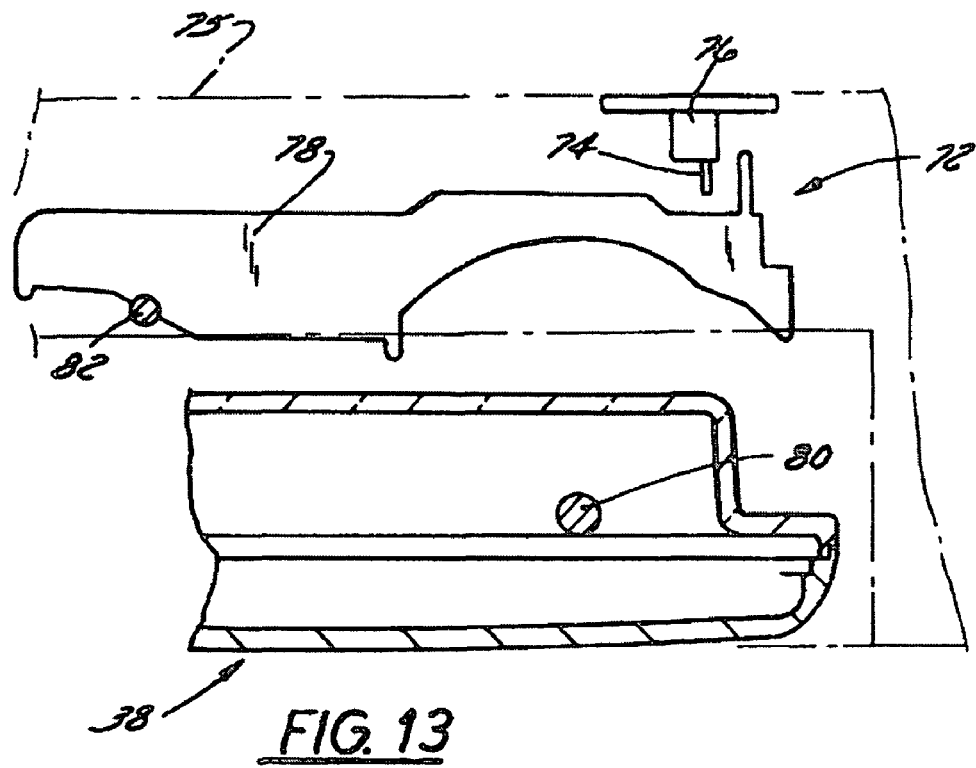
FIG. 13 is a partial cross section of an open/close switch for a front video display screen in an open position.
Figure 14:
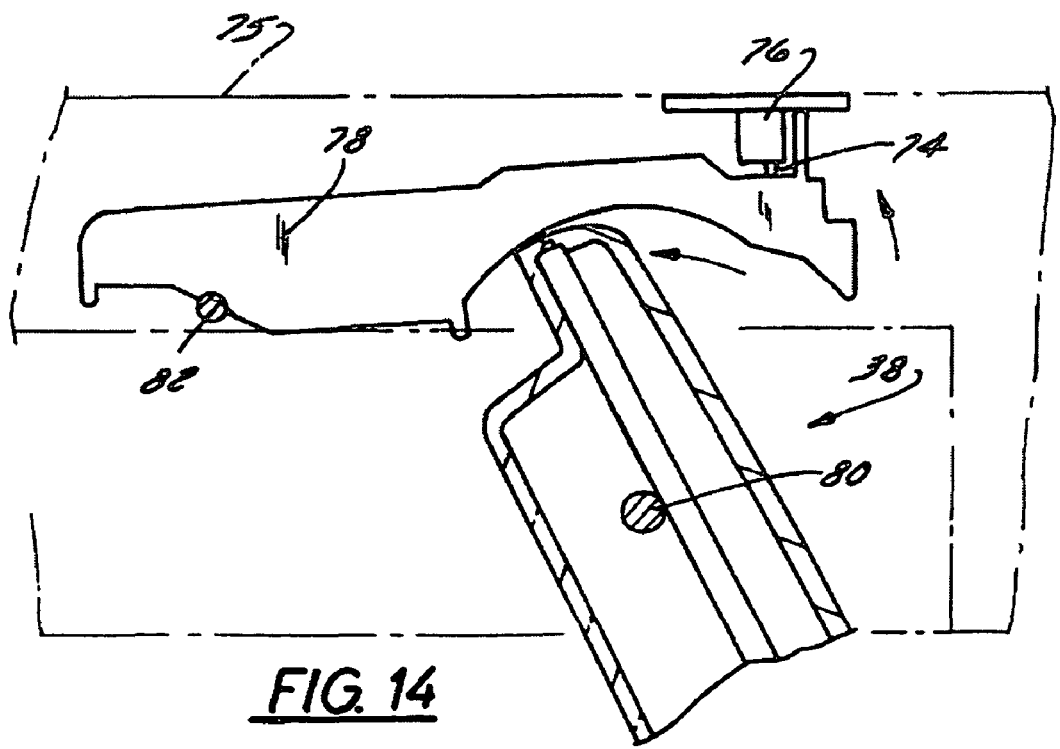
FIG. 14 is a partial cross section of the open/close switch of FIG. 13 in a closed position.

Turning to FIGS. 13-14, the forward video screen 38 includes an open/close switch mechanism 72 configured to indicate the open/close position of the forward video screen 38. The open/close switch mechanism 72 includes a displaceable switch lever 78 that depresses a plunger 74 of a switch 76 when the forward video screen 38 has been deployed in the open position. The open/close switch mechanism 72 is disposed in a console 75 (shown in phantom in FIGS. 13-14) that holds the forward video screen 38 when folded into the console 75 in its closed position. In operation, as the forward video screen 38 is rotated about a horizontal axis 80 when deploying it in its open position, part of the housing of the forward video screen 38 pushes the switch lever 78 causing the lever 78 to rotate about a horizontal axis 82. As switch lever 78 is rotated, the lever 78 pushes the plunger 74 into the switch 76. As is discussed in more detail below, the plunger 74 is depressed, the switch 76 is closed and a signal indicating the switch 76 is closed because the forward video screen 38 is deployed is communicated to the controller 70 (FIG. 16).

Figure 15:
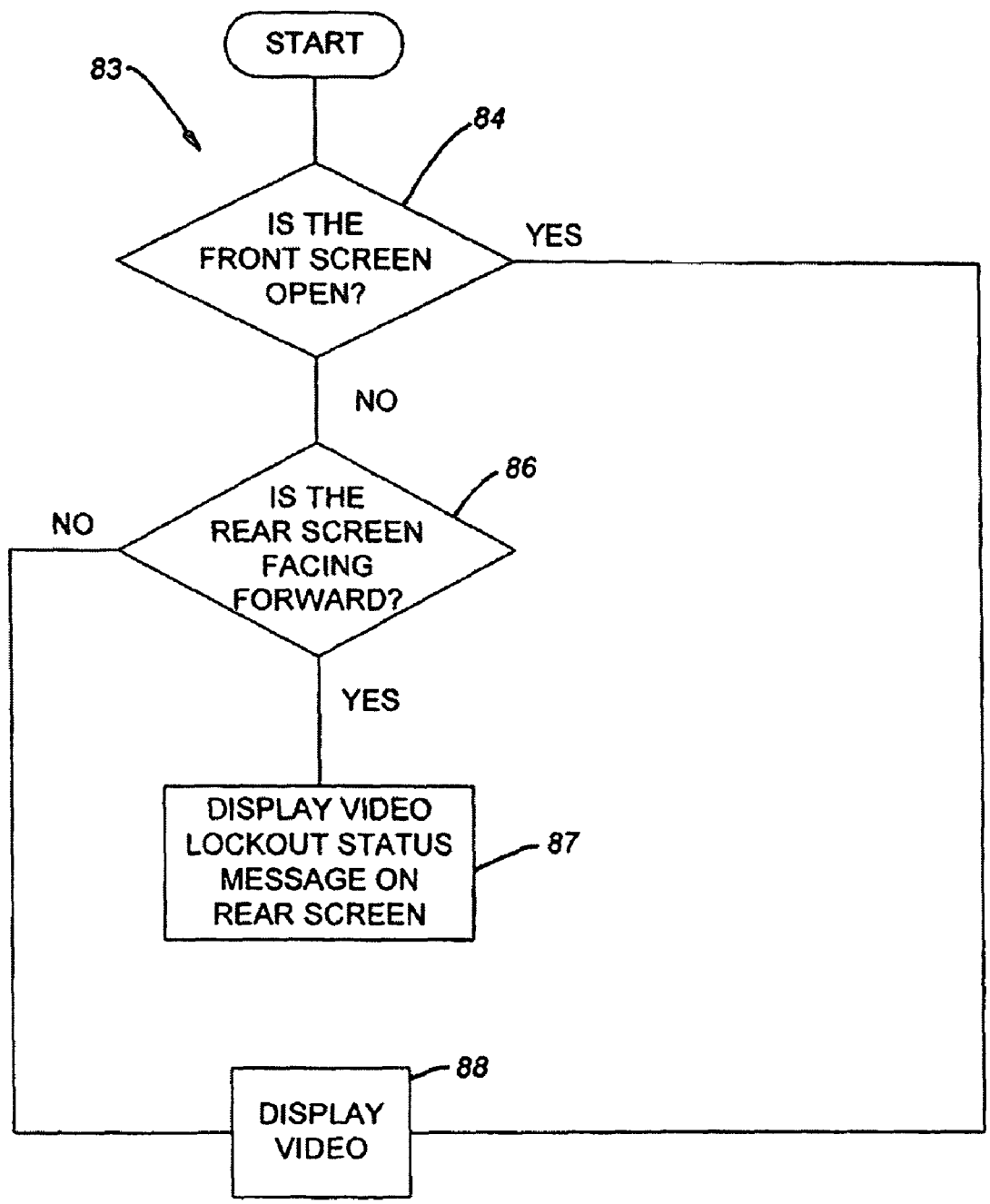
FIG. 15 is a flow chart of a method employed by a driver distraction interlock system of the present invention.

FIGS. 15 and 16 illustrate a method and basic electronic hardware used in implementing a driver distraction interlock system 81 that only permits the rear video screen 40 to display video thereon when facing the front of the vehicle 30 when the forward video screen 38 is deployed in the open position. Referring now to FIG. 15, a preferred but exemplary embodiment of a driver distraction interlock method flow chart 83 depicting the logic employed by the controller 70 shown in FIG. 16 of the driver distraction interlock system 81 is shown. In a first step 84, the driver distraction interlock system 81 determines whether the forward video screen 38 is open. If the forward video screen 38 is open, video may be displayed on the rear video screen 40. If the forward video screen 38 is closed, a second step 86 determines whether the rear video screen 40 is facing forward or rearward. If the second video screen 40 is facing rearward, the controller 70 allows the displaying of video in step 88 thereon. If the second video screen 40 is facing forward, however, the controller 70 prohibits the displaying of video on the second video screen 40 and instead displays an informative video lockout status message 87 indicating that the displaying of video is prohibited. In a preferred implementation, the video lockout status message 87 also can additionally request that the forward video screen 38 be opened in order for video to be displayed on the rear video screen 40 when the rear video screen 40 is facing forwardly. For example, in one preferred implementation, a video lockout status message that states "Second row screen must be fully open to view third row screen in rotated position" is displayed on the rear video screen 40 when facing forwardly to indicate that the front video screen 38 must be first deployed in the open position before video can be displayed on the rear video screen 40.

Referring now to FIG. 16, the driver distraction interlock system 81 configured to prevent the distraction of the driver of the vehicle by video displaying on the rear video screen 40 is provided by the controller 70 being in communication with the forward video screen 38 and rear video screen 40. The controller 70 is generally configured, such as via programming in firmware or software, to carry out the driver distraction interlock method 83 discussed above and shown in FIG. 15. The driver distraction interlock system 81 includes a digital bus 90 configured to allow communication between the forward video screen 38 and rear video screen 40. A forward video screen open/closed status message or information is communicated via line 92 across the bus 90 to the controller 70 enabling the controller 70 to determine whether the forward video screen 38 is open in accordance with step 84 of the driver distraction interlock method 83. As previously discussed, this is done via a signal from the switch 76 of the open/close switch mechanism 72 when the switch 76 is closed when the forward video screen 38 is open. A rear video screen position status message or information is communicated via line 94 to the controller 70 that indicates whether the rear video screen 40 is deployed in an open position as well as which direction the rear video screen 40 is facing forward. As is previously discussed, this is done via signals from switches 60, 64 and 66 that indicate whether the rear video screen 40 is open as which direction it is facing.

When the message communicated along line 92 indicates that the forward video screen 38 is open is received by the controller 70, the controller 70 is configured to permit video to be displayed on the rear video screen 40 no matter which direction it is facing If, however, the message from forward video screen 38 indicates that it is closed, the controller 70 then queries the message or information being communicated from the rear video screen 40 to determine whether the rear video screen 40 is facing forward in step 86. If the rear video screen 40 is facing rearward, logic within the controller 70 causes the controller 70 to communicate via bidirectional line 94 of bus 90, such as by sending a message along line 94, to allow the display of video on the rear video screen 40 in step 88. If, however, the rear video screen 40 is facing the front of the vehicle 30, logic within the controller 70 causes the controller 70 to communicate along line 94, such as by sending a message along line 94, to prevent the display of video on the rear video screen 40. Further, this causes the rear video screen 40 to display a message on the rear video screen 40. The message displayed on the screen 40 preferably indicates to a passenger that video may not be displayed on the rear video screen 40 while the rear video screen 40 is facing forward and the forward video screen 38 is closed.

In an alternative embodiment the vehicle 30 includes only a single rear video screen 40, and the driver distraction interlock system is in communication with the rear video screen 40 and a gear shift arrangement of the vehicle's transmission. In this embodiment of the present invention, the controller 70 determines whether the vehicle is in "park," "drive," "reverse," etc. If the vehicle 30 is in park, the controller 70 sends a signal along the bus 90 to the rear video screen 40 to allow the display of video thereon. If the vehicle is not in park, the controller sends a query along the bus 90 to determine whether the rear video screen 40 is facing forward or rearward. If the rear video screen 40 is facing the rear of the vehicle 30, then the controller 70 sends a signal along the bus 90 to allow the displaying of video thereon. However, if the rear video screen is facing forward, the controller 70 sends a signal along the bus 90 to prevent the display of video thereon. Instead, a message is displayed on the rear video screen 40 indicating that video cannot be displayed on the rear video screen 40 when the rear video screen 40 is facing forward and the vehicle 30 is not in park. For example, in one preferred implementation, a message that states "Vehicle must be in Park to view screen in rotated position" is displayed on the rear video screen 40 to indicate video cannot be displayed on the rear video screen 40 while it is facing toward the front of the vehicle 30 unless the vehicle 30 is in Park.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. An overhead video display screen system installed within a motor vehicle comprising:
    a rear video screen mounted to a ceiling of the motor vehicle, wherein the rear video screen swivels between a rearward facing position and a forward facing position; and
    a driver distraction interlock system in communication with the rear video screen that is configured to selectively prevent the display of video when the rear video screen is in the forward facing position.

2. The overhead video display screen system of claim 1, wherein the driver distraction interlock system is configured to prevent the display of video when the rear video screen is in the forward facing position and the vehicle is not in park.

3. The overhead video display screen system of claim 2, wherein the driver distraction interlock system is configured to display a warning message on the rear video screen when the driver distraction interlock system prevents the display of video.

4. The overhead video display screen system of claim 3, wherein the warning message indicates that the vehicle must be in park to view video while the rear video screen is in the forward facing position.

5. The overhead video display screen system of claim 1, further comprising a forward video screen mounted to the ceiling of the motor vehicle, wherein the forward video screen is positioned forward relative to the rear video screen and between a rearview mirror of the vehicle and the rear video screen.

6. The overhead video display screen system of claim 5, wherein the forward video screen is selectively movable between an open position and a closed position.

7. The overhead video display screen system of claim 6, wherein the forward video screen is positioned to block a driver's view of the rear video screen through the rearview mirror when the rear video screen is in the forward facing position.

8. The overhead video display screen system of claim 7, wherein the driver distraction interlock system is configured to prevent the display of video on the rear video screen when the forward video screen is in the closed position and the rear video screen is in the forward facing position.

9. The overhead video display screen system of claim 1, wherein the rear video screen includes a first switch configured to detect whether the rear video screen is open or closed and a second switch configured to detect a rotational position thereof.

10. The overhead video display screen system of claim 9, wherein the driver distraction interlock system comprises a controller, and wherein the first switch and the second switch are in communication with the controller of the driver distraction interlock system.

11. The overhead video display screen system of claim 10, further comprising a forward video screen positioned forward relative to the rear video screen, wherein the forward video screen includes a third switch configured to detect whether the forward video screen is open or closed.

12. The overhead video display screen system of claim 11, wherein the third switch is in communication with the controller of the driver distraction interlock system.

13. The overhead video display screen system of claim 1, wherein the driver distraction interlock system includes a bus and a controller in communication with the rear video screen.

14. The overhead video display screen system of claim 13, further comprising a forward video screen positioned forward relative to the rear video screen and disposed in communication with the bus and the controller of the driver distraction interlock system.

15. A vehicle having a video display system comprising:
a plurality of rows of seats comprising a first row of seats having a driver seat and a passenger seat and a second row of seats rearwardly of the first row of seats;
a rearview mirror disposed forwardly of the second row of seats;
a forward video screen positioned at a first location within the vehicle rearwardly of the rearview mirror, the forward video screen movable between a closed stowed position and an open viewing position;
a rear video screen positioned at a second location within the vehicle rearwardly of the forward video screen with the forward video screen disposed between the rear video screen and rearview mirror such that the forward video screen blocks the rear video screen from being viewed using the rearview mirror when the forward video screen is in the open viewing position, the rear video screen movable between a closed stowed position and an open viewing position that swivels between a rearward facing position and a forward facing position; and
a driver distraction interlock system that prevents display of video on the rear video screen when the rear video screen is in the open position facing forwardly and the forward video screen is in the closed stowed position.

16. The vehicle of claim 15, wherein the driver distraction interlock system is configured to display a message on the rear video screen when displaying of video is prevented.

17. The vehicle of claim 15, wherein the vehicle includes three rows of seats.

18. The vehicle of claim 17, wherein the second row of seats swivel between a forward facing position and a rearward facing position such that when the second row of seats is in the rearward facing position and the rear video screen is in the forward facing position the rear video screen is viewable by a user seated in the second row of seats.

19. The vehicle of claim 15, wherein the driver distraction interlock system comprises (a) a first sensor arrangement that provides an indication of one of an open and closed position and an indication of a rotational position of the rear video screen, (b) a second sensor arrangement that provides an indication of one of an open and closed position of the forward video screen, and (c) a controller linked to the first and second sensor arrangements and configured to prevent display of video on the rear video screen when the rear video screen is in the open position facing forwardly and the forward video screen is in the closed position.

20. The vehicle of claim 19, wherein the first sensor arrangement comprises a first switch used to detect one of an open and closed position of the rear video screen and a second switch used to detect when the rear video screen is facing forwardly, and wherein the second sensor arrangement comprises a third switch used to detect one of an open and closed position of the forward video screen.

21. An overhead video display screen system for a motor vehicle comprising:
a rear video screen mounted to a ceiling of the motor vehicle, the rear video screen movable between a closed position and an open viewing position that swivels between a rearward facing position and a forward facing position;
a forward video screen mounted to the ceiling of the motor vehicle forwardly of the rearward video screen, the front video screen movable between a closed position and an open viewing position;
a driver distraction interlock system comprising:
a first sensor arrangement used in sensing a rotational position of the rear video screen when the rear video screen is in an open viewing position;
a second sensor arrangement used in sensing when the forward video screen is in a closed position; and
a controller linked to the first and second sensor arrangements that is configured to prevent display of video on the rear video screen when the rear video screen is in a forward facing position and the forward video screen is in the closed position.

22. The overhead video display of claim 21, wherein the first sensor arrangement comprises a first sensor configured to sense one of an open and closed position of the rear video screen and a second sensor configured to sense the rotational position of the rear video screen and wherein the second sensor arrangement comprises a third sensor configured to sense one of an open and closed position of the forward video screen.

* * * * *